United States Patent [19]

Yasuhara

[11] Patent Number: 4,494,507
[45] Date of Patent: Jan. 22, 1985

[54] CONTROL SYSTEM FOR A FUEL INJECTION INTERNAL COMBUSTION ENGINE INCLUDING A FUEL INJECTION RATE DETECTOR

[75] Inventor: Seishi Yasuhara, Yokosuka, Japan

[73] Assignee: Nissan Motor Company, Limited, Japan

[21] Appl. No.: 495,662

[22] Filed: May 18, 1983

[51] Int. Cl.³ .............................................. F02D 31/00
[52] U.S. Cl. .................................... 123/357; 123/478; 73/119 A
[58] Field of Search ............... 123/357, 358, 359, 478, 123/446; 73/119 A

[56] References Cited

U.S. PATENT DOCUMENTS

| | | | |
|---|---|---|---|
| 4,359,032 | 11/1982 | Ohie | 123/478 |
| 4,402,294 | 9/1983 | McHugh et al. | 123/478 |
| 4,423,485 | 12/1983 | Sami et al. | 123/357 |
| 4,438,496 | 3/1984 | Ohie | 123/458 |

FOREIGN PATENT DOCUMENTS

| | | |
|---|---|---|
| 57-35154 | 2/1982 | Japan . |
| 159939 | 10/1982 | Japan .................................. 123/357 |
| 86418 | 5/1983 | Japan .................................. 73/119 A |

Primary Examiner—Magdalen Y. C. Moy
Attorney, Agent, or Firm—Lowe, King, Price & Becker

[57] ABSTRACT

A control system for an internal combustion engine having a fuel injection nozzle which is connected via a fuel line to a fuel injection pump so that fuel forced out of the fuel injection pump is conducted via the fuel line to the fuel injection nozzle and is then injected into an engine via the fuel injection nozzle. A valve member is movably disposed in the fuel line to allow the fuel to pass to the fuel injection nozzle when the valve member is displaced from a closed position, so that displacement of the valve member represents the rate of fuel injection. A sensor responsive to displacement of the valve member is provided to sense the rate of fuel injection. Also provided are means for sensing an operating condition of the engine and generating a signal indicating the condition, means responsive to the signal for generating a signal which indicates the desired rate of fuel injection into the engine which varies as a function of the sensed operating condition, and means responsive to the signals to control the actual fuel injection rate.

1 Claim, 19 Drawing Figures

FIG.3
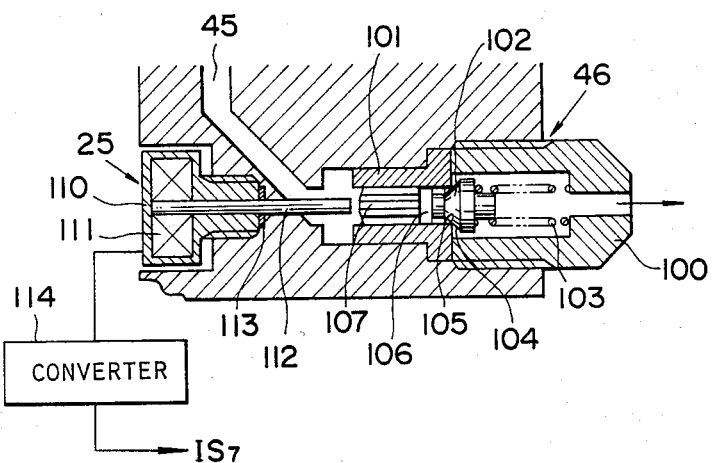
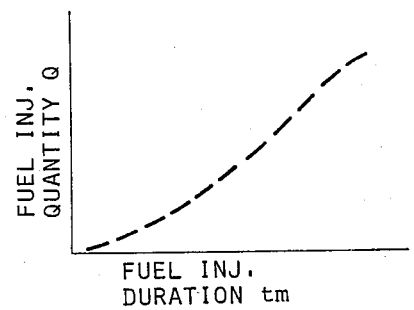
FIG.5
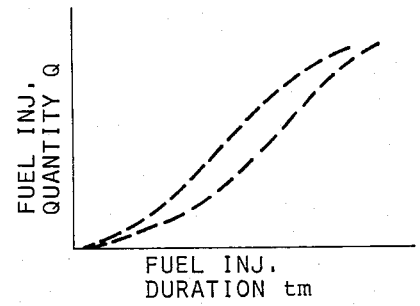
FIG.6
FIG.7
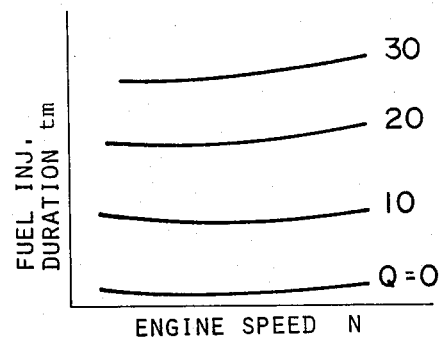

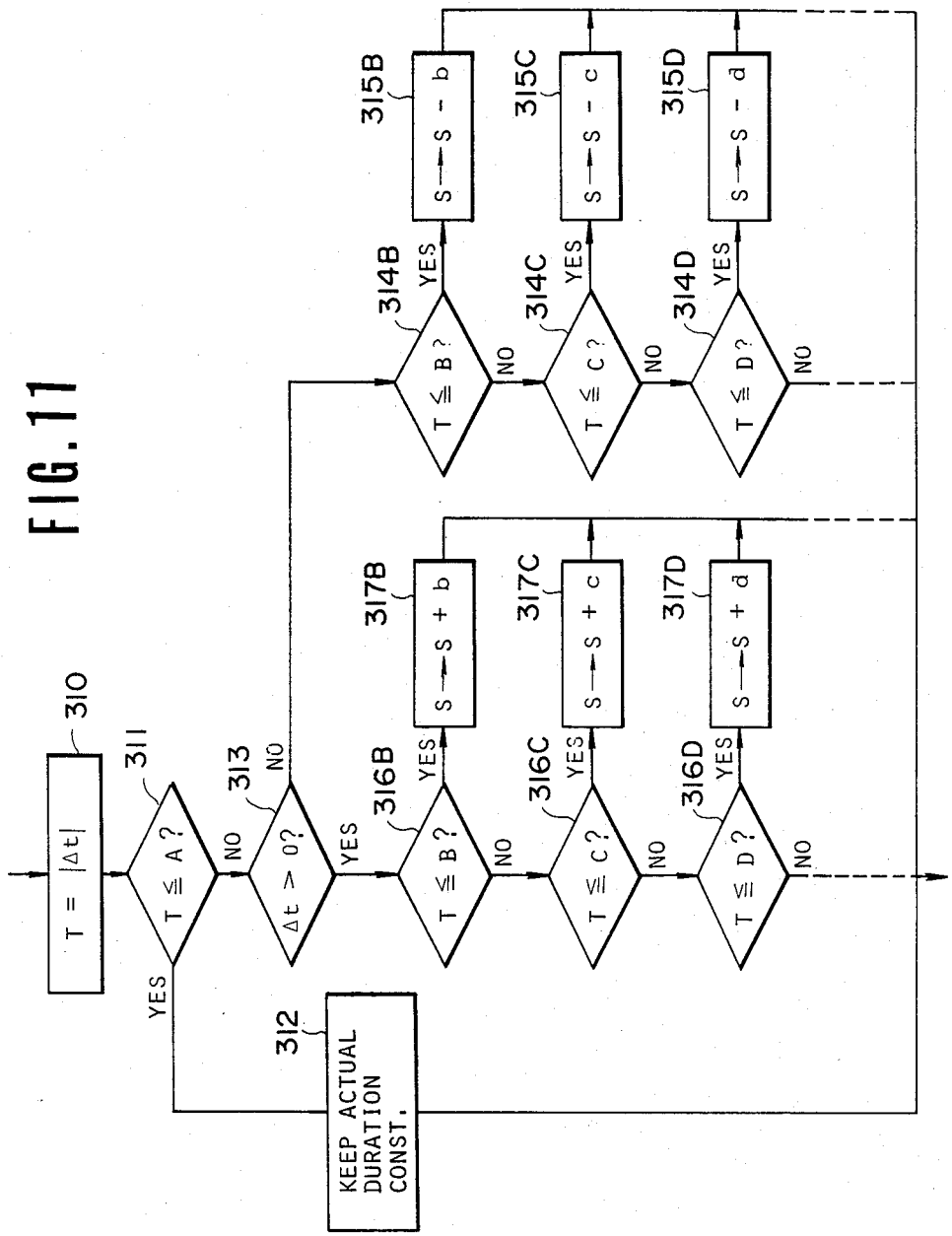

CONTROL SYSTEM FOR A FUEL INJECTION INTERNAL COMBUSTION ENGINE INCLUDING A FUEL INJECTION RATE DETECTOR

BACKGROUND OF THE INVENTION

This invention relates to a fuel injection rate detector for a control system of an internal combustion engine, such as a diesel engine, to which fuel is supplied by fuel injection.

Diesel engines are supplied with fuel by means of fuel injection pumps. The rate of fuel injection to the engine is one of several parameters which can be indicative of engine load. Generally, the engine load needs to be sensed for reliable control of fuel injection timing or exhaust gas recirculation. Additionally, sensing the actual fuel injection rate is indispensable for closed-loop control of the fuel injection rate.

SUMMARY OF THE INVENTION

It is an object of this invention to provide a more reliable fuel injection rate detector.

In accordance with this invention, a fuel injection rate detector is applied to an internal combustion engine having a fuel injection nozzle. The fuel injection nozzle is connected via a fuel line to a fuel injection pump so that fuel forced out of the fuel injection pump is conducted via the fuel line to the fuel injection nozzle and is then injected into the engine via the fuel injection nozzle. A valve member of a delivery valve is movably disposed in the fuel line for allowing the fuel to pass to the fuel injection nozzle when the valve member is displaced from a closed position, so that displacement of the valve member represents the rate of fuel injection into the engine. A sensor responsive to displacement of the valve member is provided to sense the rate of fuel injection into the engine.

The above and other objects, features and advantages of this invention will be apparent from the following description of preferred and alternative embodiments thereof, taken in conjunction with the drawings.

BRIEF DESCRIPTION OF THE DRAWINGS

FIG. 3 is an enlarged sectional view of the lift or displacement sensor of FIGS. 1 and 2.

FIG. 5 is a diagram of the relationship between the fuel injection quantity Q and the fuel injection duration tm.

FIG. 6 is a diagram of the relationship shown in FIG. 5 as measured at different engine speeds.

FIG. 7 is a diagram of the relationship between the fuel injection duration tm and and the engine speed N at different fuel injection quantities.

FIG. 11 is a flowchart illustrating part of the flowchart of FIG. 10 in greater detail.

Like or same parts are denoted by the same reference numerals throughout the drawings.

DESCRIPTION OF THE PREFERRED EMBODIMENTS

Figure 1:
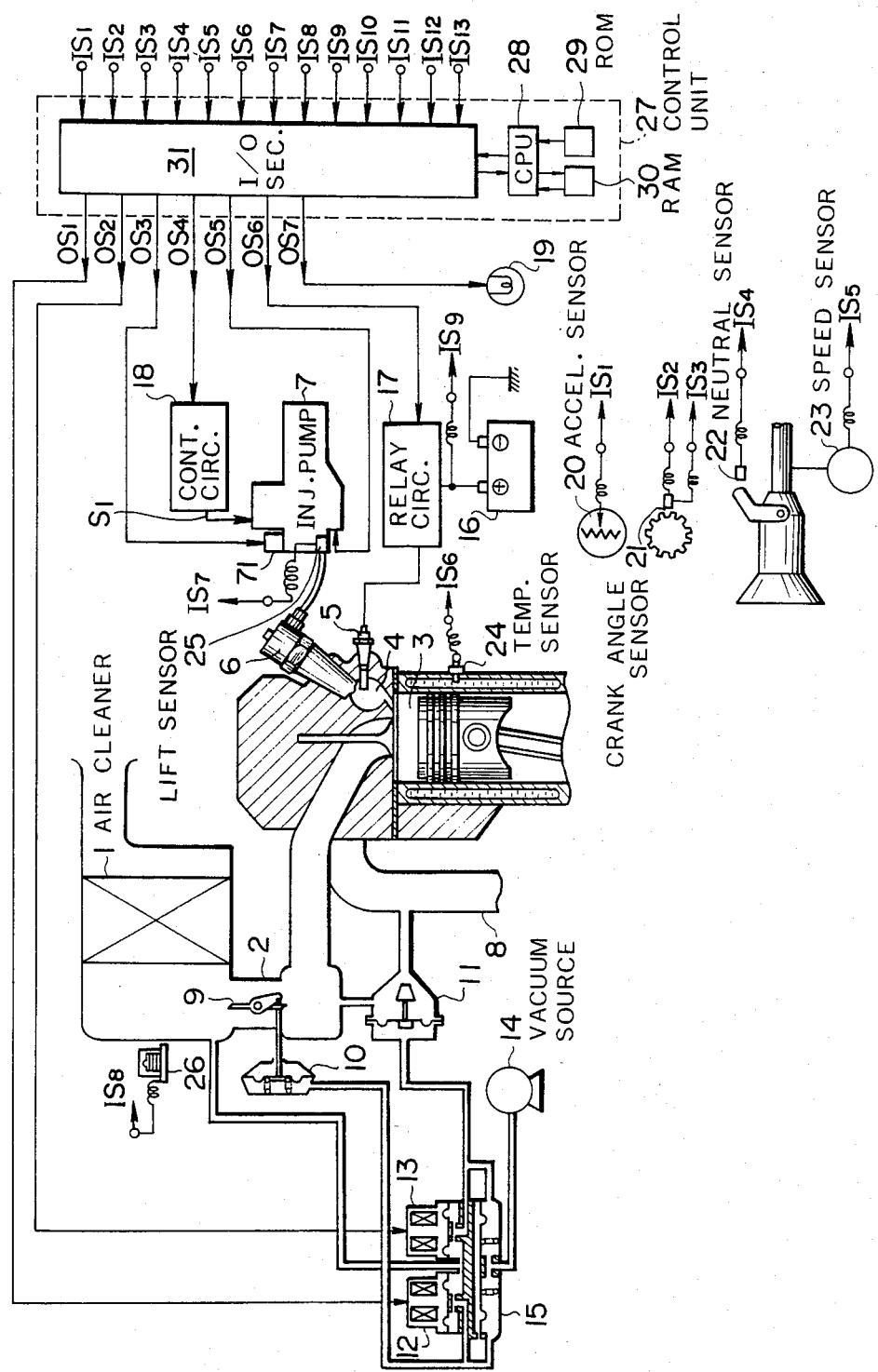
FIG. 1 is a diagram of a fuel injection control system for an internal combustion engine which includes a fuel injection rate detector according to an embodiment of this invention.

In FIG. 1, there is shown an electronic fuel injection control system for a fuel injection type internal combustion engine which includes a fuel injection rate detector according to a first embodiment of this invention.

The engine has an air cleaner 1 installed in an air intake passage 2 leading to main combustion chambers 3, one of which is shown. The main chambers 3 each communicate with an auxiliary or swirl combustion chamber 4, into which a glow plug 5 projects. The outlets of fuel injection nozzles or valves 6, one of which is shown, open into the respective swirl chambers 4. A fuel injection pump 7 supplies fuel to the swirl chambers 4 and thus main chambers 3 via the fuel injection nozzles 6.

An exhaust passage 8 extends from the main combustion chambers 3. A throttle valve 9 is located in the intake passage 2 downstream of the air cleaner 1. A pressure-responsive vacuum actuator 10 drives the throttle valve 9. An exhaust gas recirculation control valve 11 is located in a passage connecting the exhaust passage 8 and the intake passage 2 downstream of the throttle valve 9. The control valve 11 has a pressure-responsive vacuum actuator to drive the valve member thereof. An electrically-driven or electromagnetic valve 12 is provided along a passage interconnecting the actuator 10 and the intake passage 2 upstream of the throttle valve 9 but downstream of the air cleaner 1 to selectively allow and interrupt supply of atmospheric pressure to the actuator 10. Another electrically-driven or electromagnetic valve 13 is provided along a passage interconnecting the actuator of the control valve 11 and the intake passage 2 upstream of the throttle valve 9 but downstream of the air cleaner 1 to selectively allow and interrupt supply of atmospheric pressure to the actuator of the control valve 11. A vacuum source 14, such as a vaccum pump, communicates with the passage between the actuator 10 and the electromagnetic valve 12, and with the passage between the actuator of the control valve 11 and the electromagnetic valve 13 via a pressure- or vacuum-regulating valve 15 to supply regulated vacuum pressure to the actuator 10 and the actuator of the control valve 11.

A battery 16 is connected to the glow plug 5 to energize the latter. A relay circuit 17 is disposed along the connection of the battery 16 to the glow plug 5 to control energization of the glow plug 5. A bulb or light 19 is provided to indicate energization of the glow plug 5.

A control or driving circuit 18 is associated with the fuel injection pump 7 to drive an electrically-powered actuator (described hereinafter), such as an electric motor, which adjusts the rate of fuel injection into the combustion chambers 3 and 4 via the fuel injection pump 7 and the fuel injection nozzles 6.

An accelerator pedal position sensor 20 is associated with an accelerator pedal to generate a signal $IS_1$ indicative of the position of the accelerator pedal, that is, the degree of depression of the accelerator pedal or the depression angle thereof. The sensor 20 includes a potentiometer mechanically linked to the accelerator pedal to output the voltage signal $IS_1$ related to the position of the accelerator pedal. Generally, the signal $IS_1$ represents the power required of the engine.

A crank angle sensor 21 is associated with the crankshaft or the camshaft of the engine to generate short-pulse signals $IS_2$ and $IS_3$ indicative of predetermined angles of engine revolution. For example, the pulses of the signal $IS_2$ are outputted at predetermined crankshaft angular positions spaced at regular intervals of 120° in the case of a six-cylinder engine. In contrast, the pulses of the signal $IS_3$ are outputted at regular intervals of 1° of engine revolution. In more detail, the sensor 21 comprises the combination of a toothed disc and two magnetic pickups. In this case, the disc is mounted on the crankshaft or the camshaft of the engine, and the pickups are fixedly placed near the disc. The teeth of the disc belong to two groups, one for the 1° pulses and the other for the 120° pulses. The first pickup is designed to generate an alternating voltage corresponding to the 1° pulse signal $IS_3$. The second pickup is designed to generate an alternating voltage corresponding to the 120° pulse signal $IS_2$. The sensor 21 also includes two waveform shaping circuits to convert the alternating voltages into the corresponding pulse signals $IS_2$ and $IS_3$.

A neutral position sensor 22 is associated with an engine power transmission to generate a signal $IS_4$ indicative of whether or not the transmission is in the neutral position. The sensor 22 includes a switch actuated by the gear shift lever of the transmission. A rotational speed sensor 23 is associated with the output shaft of the transmission to generate a signal $IS_5$ indicative of the rotational speed of the output shaft, that is, the vehicle speed in the case of a vehicular engine.

A temperature sensor 24 is attached to the engine in such a way that the sensing element of the sensor 24 is exposed to engine coolant. The sensor 24 generates a signal $IS_6$ indicative of the temperature of the engine coolant.

A lift or displacement sensor 25 is associated with one of delivery valves (described hereinafter) in the fuel injection pump 7 to detect lift or displacement of the valve member of the associated delivery valve representing the rate of fuel injection via the fuel injection pump 7 and the fuel injection nozzles 6. The sensor 25 generates a signal $IS_7$ indicative of the rate of fuel injection. The sensor 25 will be described in detail hereinafter.

A density sensor 26 is exposed to the atmosphere and generates a signal $IS_8$ indicative of the density of the atmosphere, which depends on the temperature and the pressure thereof.

A connection to the battery 16 provides a signal $IS_9$ indicative of the voltage across the battery 16.

Other elements (not shown) generate signals $IS_{10}$, $IS_{11}$, $IS_{12}$, and $IS_{13}$. The signal $IS_{10}$ indicates when a starter switch (not shown) is closed. The signal $IS_{11}$ indicates when a glow plug switch or relay is closed. The signal $IS_{12}$ indicates the temperature of the fuel. The signal $IS_{13}$ indicates the density of the fuel, i.e., the specific gravity thereof.

A control unit 27 includes a central processing unit (CPU) 28, a read-only memory (ROM) 29, a read/write or random-access memory (RAM) 30, and an input/output (I/O) interface circuit 31. The central processing unit 28 is connected to the memories 29 and 30, and the input/output circuit 31 to constitute a microprocessor system.

The I/O circuit 31 is connected to the foregoing sensors and the battery connection to receive the signals $IS_1$, $IS_2$, $IS_3$, $IS_4$, $IS_5$, $IS_6$, $IS_7$, $IS_8$, $IS_9$, $IS_{10}$, $IS_{11}$, $IS_{12}$, and $IS_{13}$. Note that the connection of the I/O section 31 to the sensors and the battery connection is omitted in the drawing for clarity. The control unit 27 generates control signals $OS_1$, $OS_2$, $OS_3$, $OS_4$, $OS_5$, $OS_6$, and $OS_7$ in response to the signals $IS_1$, $IS_2$, $IS_3$, $IS_4$, $IS_5$, $IS_6$, $IS_7$, $IS_8$, $IS_9$, $IS_{10}$, $IS_{11}$, $IS_{12}$, and $IS_{13}$. The control signals $OS_1$, $OS_2$, $OS_3$, $OS_4$, $OS_5$, $OS_6$, and $OS_7$ are outputted via the I/O circuit 31 and are generally intended to control the engine optimally.

The frequency of the pulses of the signal $IS_3$ from the crank angle sensor 21 represents the rotational speed of the engine crankshaft. The I/O circuit 31 includes a frequency detector for determining the frequency of the pulses of the signal $IS_3$ to monitor the engine rotational speed.

The I/O circuit 31 is connected to the electromagnetic valves 12 and 13 to supply the control signals $OS_1$ and $OS_2$ thereto, respectively. The control signals $OS_1$ and $OS_2$ are in the form of pulse trains. The higher levels of the control signals $OS_1$ and $OS_2$ energize the electromagnetic valves 12 and 13 to open. The lower levels of the control signals $OS_1$ and $OS_2$ de-energize the electromagnetic valve 12 and 13 and thus close them. When the electromagnetic valves 12 and 13 are opened, atmospheric air is permitted to enter the actuator 10 and the actuator of the control valve 11 via the valves 12 and 13, thus raising the pressures applied to the actuators. When the electromagnetic valves 12 and 13 are closed, air supply to the actuators is interrupted, thus lowering the pressures applied thereto toward the vacuum pressure defined by the regulating valve 15. As a result, the resultant pressure applied to the actuator 10 depends on the duty cycle of the control signal $OS_1$, so that the position of the throttle valve 9 also depends on the duty cycle of the control signal $OS_1$. Similarly, the resultant pressure applied to the actuator of the control valve 11 depends on the duty cycle of the control signal $OS_2$, so that the position of the control valve 11 also depends on the duty cycle of the control signal $OS_2$. The rate of exhaust gas recirculation depends on the positions of the valve 9 and 11. When the rate of exhaust gas recirculation needs to be changed, the control unit 27 varies the duty cycles of the control signals $OS_1$ and $OS_2$ in a suitable manner.

The I/O circuit 31 is connected to an electrically-driven or electromagnetic fuel supply cut-off valve 71 to output the control signal $OS_3$ thereto. The cut-off valve 71 is attached to the fuel injection pump 7 to selectively block and open a fuel feed line in the pump 7. The control signal $OS_3$ is a binary signal with higher and lower levels representing energization and de-energization of the cut-off valve 71 respectively. Energizing the cut-off valve 71 causes it to open, thereby allowing fuel supply to the combustion chambers 3 and 4. De-energizing the cut-off valve 71 causes it to close, thereby interrupting the fuel supply to the combustion chambers 3 and 4. When the engine needs to be stopped, the control unit 27 changes the control signal $OS_3$ to the lower level to interrupt the fuel supply to the engine.

The I/O circuit 31 is connected to the driving circuit 18 to output the control signal $OS_4$ thereto. The control circuit 18 generates a control signal $S_1$ in response to the signal $OS_4$. The control circuit 18 is connected to an actuator (described hereinafter) to output the control signal $S_1$ thereto. The actuator is designed to drive, in response to the control signal $S_1$, a control sleeve (described hereinafter) which determines the fuel injection quantity during each fuel injection stroke.

The I/O circuit 31 is connected to a fuel injection timing adjustment mechanism (described hereinafter) in the fuel injection pump 7 to output the control signal $OS_5$ thereto. The control unit 27 controls the timing adjustment mechanism via the control signal $OS_5$.

The I/O circuit 31 is connected to the glow relay 17 to output the control signal $OS_6$ thereto. The control unit 27 controls the glow relay 17 via the control signal $OS_6$ so as to control energization and de-energization of the glow plugs 5.

The I/O circuit 31 is connected to the glow light 19 to output the control signal $OS_7$ thereto. The control unit 27 controls the energization and de-energization of the glow light 19 via the control signal $OS_7$ so that the glow light 19 indicates whether the glow plugs 5 are energized or de-energized.

Figure 2:
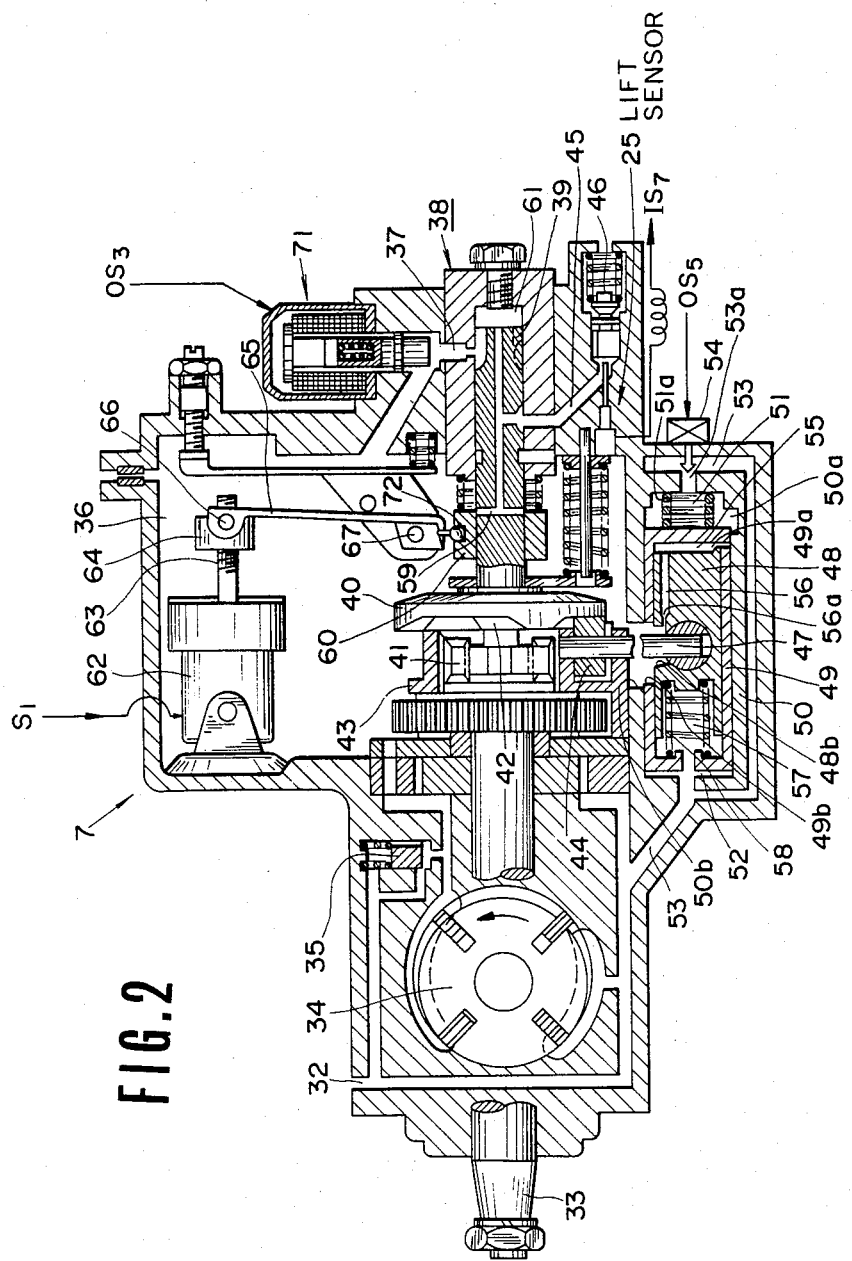
FIG. 2 is a sectional view of the fuel injection pump including the lift or displacement sensor of FIG. 1.

FIG. 2 shows details of the fuel injection pump 7, which includes a fuel inlet 32, a drive shaft 33, and a rotary or vane feed pump 34. Note that the feed pump 34 is illustrated in two ways, one being normal and the other being rotated through 90° about the vertical. The fuel inlet 32 is provided in the housing of the pump 7 and leads to the inlet of the feed pump 34. Fuel can be conducted from a fuel tank (not shown) to the fuel inlet 32 by means of a suitable fuel line (not shown). The feed pump 34 draws fuel from the tank via the fuel inlet 32. The feed pump 34 is rotated or driven via the drive shaft 34, which is connected to the cranksahft of the engine by a coupling which drives the feed pump 34 to rotate at half the speed of rotation of the crankshaft.

A pressure control valve 35 is connected across the feed pump 34 to control the pressure of fuel across the feed pump 34 and more particularly to cause it to increase linearly with the engine rotational speed. The outlet of the feed pump 34 communicates with a pump chamber 36 in the housing of the fuel injection pump 7 to supply pressurized fuel to the pump chamber 36. The fuel injection pump 7 includes a high pressure plunger pump 38, which communicates with the pump chamber 36 via an intake port 37 formed in the housing of the fuel injection pump 7. The plunger pump 38 draws fuel from the pump chamber 36 via the intake port 37. In this case, fuel flows through the pump chamber 36 while lubricating moving parts (described hereinafter) in the pump chamber 36.

The high pressure pump 38 includes a plunger 39 secured coaxially to a cam disc 40. The cam disc 40 engages the drive shaft 33 via a key coupling 41 so as to rotate along with the drive shaft 33 but be permitted to move axially relative to the drive shaft 33. The cam disc 40 has identical cam faces 42 spaced across one surface at regular angular intervals. The number of the cam faces 42 is equal to that of the combustion chambers 3 (see FIG. 1). The cam disc 40 is urged by a spring (not designated) into engagement with identical rollers 44 supported by a roller ring 43 which is stationary in the axial direction with respect to the cam disc 40. The rollers 44 are spaced circumferentially in a manner corresponding to that of the cam faces 42. As the cam faces 42 pass over the rollers 44, the cam disc 40 and the plunger 39 reciprocate axially within a predetermined range defined by the profiles of the cam faces 42. In this way, the plunger 39 reciprocates axially while rotating. The axial reciprocation of the plunger 39 causes the high pressure pump 38 to draw fuel into its working chamber 61 via the intake port 37 and drive highly pressurized fuel into delivery ports 45 formed in the housing of the fuel injection pump 7. The delivery ports 45 lead to the respective fuel injection nozzles 6 (see FIG. 1) via delivery valves 46 of the check type, so that they can conduct fuel from the plunger pump 38 to the fuel injection nozzles 6. Each axial reciprocation of the plunger 39 comprises a fuel injection stroke of the fuel injection pump 7. Note that only one combination of the delivery port 45 and the delivery valve 46 is shown.

The roller ring 43 can be rotated in the direction of rotation of the cam disc 40. The angular position of the roller ring 43 determines the time in terms of crank angle at which the cam faces 42 encounter the rollers 44, and therefore determines the time of the start of each fuel injection stroke in terms of crank angle. In other words, the fuel injection timing depends on the angular position of the roller ring 43.

A driving pin 47 connects the roller ring 43 to a plunger 48 slideably disposed in a cylinder 49. The plunger 48 extends in such a direction that axial movement thereof can cause a slight rotational displacement of the roller ring 43. Note that the illustration of the plunger 48, the cylinder 49, and associated parts is rotated through 90° about the vertical in order to show the details thereof. The cylinder 49 is also slideably disposed in a casing 50 fixed to the housing of the fuel injection pump 7. The opposing ends of the cylinder 49 and the casing 50 define a fluid chamber 51 within the casing 50, and the other opposing ends thereof define another fluid chamber 52 within the casing 50.

The cylinder 49 has an orifice 49a extending therethrough and communicating with a high pressure chamber 55 defined within the cylinder 49 by opposing ends of the plunger 48 and the cylinder 49. The casing 50 defining the fluid chamber 51 has a groove 50a, which can communicate with the orifice 49a when the cylinder 49 is displaced toward the fluid chamber 51 to a preset extent. As a result, the high pressure chamber 55 can communicate with the fluid chamber 51 via the orifice 49a and the groove 50a when the cylinder 49 is displaced toward the fluid chamber 51 to the preset extent. In other words, the orifice 49a can be selectively blocked and opened by the casing 50 in accordance with the position of the cylinder 49 relative to the casing 50. A compression spring 51a disposed in the fluid chamber 51 is seated between the casing 50 and the cylinder 49 to urge the cylinder 49 in the direction of the second fluid chamber 52.

The first fluid chamber 51 can communicate with the second fluid chamber 52 and the inlet or low-pressure side of the feed pump 34 via a fluid passage 53 formed in the casing 50 and the housing of the fuel injection pump 7. Thus, the fluid chamber 52 also communicates with the inlet of the feed pump 34. The connection of the fluid chamber 51 to the fluid passage 53 consists of an orifice 53a formed in the casing 50. An electrically-driven or electromagnetic valve 54 is provided to selectively block and open the orifice 53a.

The high pressure chamber 55 communicates with the pump chamber 36 via a passage 56 formed in the plunger 48, and openings 48b, 49b, and 50b formed respectively in the plunger 48, the cylinder 49, and the casing 50 or the housing of the fuel injection pump 7. The connection of the passage 56 to the opening 48b and thus to the pump chamber 36 consists of an orifice 56a provided in the plunger 48. In this way, the high pressure chamber 55 is supplied with the pressure or fuel in the pump chamber 36 via the passage 56, the orifice 56a, and the openings 48b, 49b, and 50b. The other opposing ends of the plunger 48 and the cylinder 49 define a low pressure chamber 57 opposite the plunger from the high pressure chamber 55. The low pressure chamber 57 communicates with the fluid chamber 52 via an opening (not designated) formed through the cylinder 49. Thus, the low pressure chamber 57 communicates with the inlet or low pressure side of the feed pump 34 via the opening, the fluid chamber 52, and the fuel passage 53, so that the chamber 57 is supplied with a relatively low pressure. A compression spring 58 disposed in the low pressure chamber 57 is seated between the plunger 48 and the casing 50 to urge the plunger 48 in the direction of the high pressure chamber 55.

The pressure in the pump chamber 36 increases linearly with the rotational speed of the feed pump 34 and thus that of the engine. Basically, as the engine rotational speed increases and thus the pressure in the high pressure chamber 55 increases, the plunger 48 is displaced against the force of the spring 58 in the direction of the low pressure chamber 57. The displacement of the plunger 48 toward the low pressure chamber 57 causes the roller ring 48 to rotate in the direction opposite that of rotation of the cam disc 40, thereby advancing the timing of the start of fuel injection stroke in terms of crank angle. In this way, the fuel injection timing generally advances as the engine rotational speed increases. Basically, as the engine rotational speed decreases and thus the pressure in the high pressure chamber 55 drops, the spring 58 displaces or returns the plunger 48 in the direction of the high pressure chamber 55. The displacement of the plunger 48 toward the high pressure chamber 55 causes the roller ring 43 to rotate in the opposite direction, thereby retarding the fuel injection timing.

Normal rotation of the cam disc 40 exerts a force on the roller ring 43 that may cause the roller ring 43 to rotate in the same direction, thereby in turn resisting movement of the plunger 48 toward the low pressure chamber 57. Therefore, increase of the pressure in the high pressure chamber 55 also causes the cylinder 49 to move in the direction of the fluid chamber 51 against the force of the spring 51a to realize or facilitate expansion of the high pressure chamber 55, so that the high pressure chamber 55 comes into communication with the fluid chamber 51 via the orifice 49a and the groove 50a. In this case, the restricted effective cross-sectional area of the orifice 53a ensures that the pressure in the fluid chamber 51 will remain higher than that in the fluid chamber 52, which communicates with the low pressure side of the feed pump 34 via the passage 53. The pressure in the fluid chamber 51 depends on the effective cross-sectional area of the orifice 53a. Since the displacement of the cylinder 49 depends on the difference in pressure between the chambers 51 and 52, the displacement of the cylinder 49 can be adjusted by changing the effective cross-sectional area of the orifice 58a. The displacement of the plunger 48 is influenced by the displacement of the cylinder 49, because the volumes of the high and the low pressure chambers 55 and 57 are defined by the relative positions of the respective pairs of opposing ends of the plunger 48 and the cylinder 49. As a result, the displacement of the plunger 48 can be adjusted by changing the effective cross-sectional area of the orifice 53a.

The control signal $OS_5$ is in the form of a pulse train. The higher level of the control signal $OS_5$ energizes the electromagnetic valve 54 to open the orifice 53a, while the lower level thereof de-energizes the valve 54 to block the orifice 53a. Thus, the duty cycle of the control signal $OS_5$ virtually determines the effective cross-sectional area of the orifice 53a from the point of view of time average. In other words, the time-averaged effective cross-sectional area of the orifice 53a depends on the duty cycle of the control signal $OS_5$. The control unit 27 (see FIG. 1) adjusts the displacement of the plunger 48 via the duty cycle of the control signal $OS_5$ in order to control the fuel injection timing. Note that the position of the plunger 48 relative to the casing 50 or the housing of the fuel injection pump 7 determines the angular position of the roller ring 43 and thus the fuel injection timing.

The fuel injection pump 7 has a control sleeve 60, mentioned previously, which is used to adjust the fuel injection quantity. The control sleeve 60 is coaxially, slideably mounted on the plunger 39. The plunger pump 38 includes a working chamber 61, which is defined by the end of the plunger 39 so that the volume of the working chamber 61 varies as the plunger 38 moves axially. The working chamber 61 communicates with the intake port 37 only during the expansion of the working chamber 61 via one of a plurality of axial grooves in the end of the plunger 38 so that the fuel is drawn from the pump chamber 36 into the working chamber 61. The plunger 39 has an axial passage and a radial passage, through which the working chamber 61 communicates with one of the delivery ports 45 only during contraction of the working chamber 61 so that the fuel is forced out of the working chamber 61 into the delivery port 45. The forced supply of fuel to the delivery port 45 causes fuel injection via the associated fuel injection nozzle 6 (see FIG. 1). The plunger 39 has a diametrical spill port 59 extending therethrough. The spill port 59 communicates with the working chamber 61 via the axial passage of the plunger 39. The spill port 59 opens into the pump chamber 36 and can be selectively blocked and opened by the control sleeve 60 in accordance with the relative axial positions thereof. When the plunger 39 moves axially in the direction of contracting the working chamber 61, first the openings of the spill port 59 are blocked by the control sleeve 60 to allow fuel injection and then the openings of the spill port 59 are unblocked to return the fuel from the working chamber 61 to the pump chamber 36 via the spill port 59 and the axial passage of the plunger 39. The venting of fuel from the working chamber 61 into the pump chamber 36 results in the end of the fuel injection stroke. In this case, the axial position of the plunger 39 at which the openings of the spill port 59 switch from the blocked to the unblocked condition depends on the axial position of the control sleeve 59, so that the stroke interval of the plunger 39 effecting fuel injection also depends on the axial position of the control sleeve 59. As a result, the axial position of the control sleeve 59 determines the fuel injection quantity during each injection stroke.

An electric motor 62 located in the pump chamber 36 is provided to actuate the control sleeve 60. The motor 62 has a threaded shaft 63 on which an axially movable member 64 is mounted. The member 64 has a corresponding threaded hole extending therethrough. The shaft 63 passes through the hole of the member 64, so that the member 64 engages the shaft 63 via the threads. The member 64 is supported in such a manner as to be incapable of rotating along with the shaft 63, and therefore the member 64 moves axially with respect to the shaft 63 as the shaft 63 rotates. A link lever 65 is pivotally supported on the housing of the fuel injection pump 7 via a pin 67 located between the ends of the lever 65. One of the ends of the lever 65 is pivotally connected to the movable member 64 by a pin 66, and the other is pivotally connected to the control sleeve 60 by a ball-and-socket joint 72. The axis of the shaft 63 is parallel to that of the control sleeve 60. As the member 64 moves axially due to rotation of the shaft 63, the lever 65 pivots about the pin 67 and causes the control sleeve 60 to move in the opposite axial direction.

The motor 62 is electrically connected to the control circuit 18 (see FIG. 1) to receive the control signal $S_1$ therefrom. Specifically, the angular position or rotation of the shaft 63 is determined by the control signal $S_1$, which responds to the control signal $OS_4$ as described previously.

As described hereinbefore, the electromagnetic fuel supply cut-off valve 71 is provided to interrupt fuel injection upon need. The valve 71 is so positioned within the housing of the fuel injection pump 7 as to be able to selectively block and open the fuel intake port 37. Blocking the fuel intake port 37 with the valve 71 interrupts the fuel supply from the pump chamber 37 to the working chamber 61, thereby disabling fuel injection. Opening the fuel intake port 37 enables fuel injection. The valve 71 is connected to the control unit 27 (see FIG. 1) to receive the control signal $OS_3$ therefrom, through which the control unit 27 controls the valve 71.

The lift or displacement sensor 25 is associated with one of the delivery valves 46. During each fuel injection stroke, pressurized fuel forced out of the plunger pump 38 flows through one of the delivery ports 45, displacing and thereby opening the associated delivery valve 46. Displacement or lift of each of the delivery valves 46 thus represents the rate of fuel injection. The lift or displacement sensor 25 detects lift or displacement of the associated delivery valve 46.

FIG. 3 shows details of the combination of the delivery valve 46 and the lift or displacement sensor 25. The delivery valve 46 includes a hollow cylindrical holder 100 threaded onto the housing of the fuel injection pump 7. The cylindrical bore through the holder 100 forms part of the delivery port 45. The delivery valve 46 includes a hollow cylindrical guide 101 aligning coaxially with the holder 100 and having a flanged end. The flanged end of the guide 101 is clamped between the end of the holder 100 and a step formed as part of the delivery port 45 in the housing of the fuel injection pump 7, so that the guide 101 is secured to the housing of the fuel injection pump 7. The cylindrical bore through the guide 101 forms the part of the delivery port 45 immediately upstream of the holder 100. The inside diameter of the guide 101 is smaller than that of the holder 100.

The delivery valve 46 includes a conical or tapered valve member 102 and a compression return spring 103. The valve member 102 and the spring 103 are movably located in the bore of the holder 100. The valve member 102 is coaxial with the holder 100. The tip of the valve member 102 projects into the bore of the guide 101. The spring 103 is seated between a step at the downstream end of the holder 100 and the larger-diameter end of the valve member 102 to urge the valve member 102 in the axial direction toward the guide 101. The valve member 102 is normally held by the force of the spring 103 in a closed position where the conical or tapered surface 104 of the valve member 102 is in contact with the downstream end of the guide 101 defining the outlet thereof and forming a valve seat 105. In this way, the valve member 102 normally closes or blocks the bore of the guide 101. When the pressure of fuel forced out of the plunger pump 38 into the delivery port 45 exceeds a predetermined level, the valve member 102 is displaced axially from the closed position against the force of the spring 103, separating from the valve seat 105 and thereby opening the bore of the guide 101. When the pressure of fuel in the delivery port 45 drops below the predetermined level, the valve member 102 is returned axially to the closed position by the force of the spring 103.

A cylindrical piston 106 and a cylindrical guide stem 107 are secured to the valve member 102, and are slidably disposed in the bore of the guide 101. The piston 106 is located between the stem 107 and the valve member 102. The piston 106, the stem 107, and the valve member 102 are coaxially aligned. When the piston 106 emerges from the downstream end of the bore of the guide 101 due to increase of the pressure of fuel in the delivery port 45 above a predetermined level, the delivery valve 46 allows fuel to be delivered to the associated fuel injection nozzle 6, thereby effecting fuel injection. While the piston 106 remains within the bore of the guide 101, fuel is prevented from passing through the delivery valve 46 and thus fuel injection is disabled in spite of the fact that the valve member 102 is not in contact with the valve seat 105. To this end, the diameter of the piston 106 essentially matches the diameter of the hollow the guide 101. The stem 107 is provided with axial grooves, through which fuel can flow when the piston 106 is out of the bore of the guide 101. When the piston 106 re-enters the bore of the guide 101 due to decrease of the pressure of fuel in the delivery port below the predetermined level, the delivery valve 46 interrupts or ends fuel injection.

A spacing can be formed between the piston 106 and the valve member 102. This spacing causes fuel in the delivery port 45 downstream of the delivery valve 46 to be drawn back in the upstream direction as the piston 106 enters the bore of the guide 101 at the end of fuel injection. As a result, the pressure of fuel applied to the fuel injection nozzle 6 can be quickly reduced and a considerably lower amount of fuel may be injected via the nozzle 6 at or immediately after the end of fuel injection.

The lift or displacement sensor 25 includes a casing 110, a sensing winding or induction coil 111, and a core 112 made of magnetic material, such as iron. The coil 111 and the core 112 are fixedly housed by the casing 110, which is threaded onto the housing of the fuel injection pump 7. The coil 111 surrounds one end of the core 112. The opposite end of the core 112 projects out of the casing 110 and into the delivery port 45 upstream of the guide 101 of the delivery valve 46. The end of the core 112 extends to near the guide 101 so that the impedance or inductance of the coil 111 varies as a function of the displacement, i.e., the axial position of the guide stem 107. To this end, the guide stem 107 is made of magnetic material, such as iron. In this case, the longitudinal axis of the core 112 is aligned coaxially with the guide 101, so that the core 112 extends in the direction of displacement or lift of the stem 107 or the valve member 102. The guide stem 107 may also be made of non-magnetic material.

Since the pressure of fuel in the delivery port 45 reaches a level of 200 or 300 atm., it is necessary to provide an oil seal 113 around the core 112 at the boundary between the casing 110 and the housing of the fuel injection pump 7 to prevent fuel leakage from the delivery port 45 along the core 112 and the casing 110. The threaded connection between the casing 110 and the housing of the fuel injection pump 7 should be so designed that tapered contacting surfaces of the casing 110 and the housing of the fuel injection pump 7 can prevent fuel leakage from the delivery port 45 along the casing 110.

The lift or displacement sensor 25 may include a known impedance- or inductance-to-voltage converter 114. In this case, the converter 114 is connected across the coil 111 to generate the signal $IS_7$ whose voltage varies as a function of the impedance or inductance of the coil 111 representing the position or displacement of the valve member 102.

The converter 114 may comprise a fixed-frequency alternating-voltage generator, the output of which is applied to a network of a resistor or resistors and the coil 111 so that the amplitude of an alternating voltage across the resistor varies as a function of the impedance or inductance of the coil 111. The converter 114 may also comprise an amplitude-to-voltage converter, the input terminal of which receives the above alternating voltage across the resistor to generate, at the output terminal thereof, a voltage varying as a function of the impedance or inductance of the coil 111.

Figure 4:
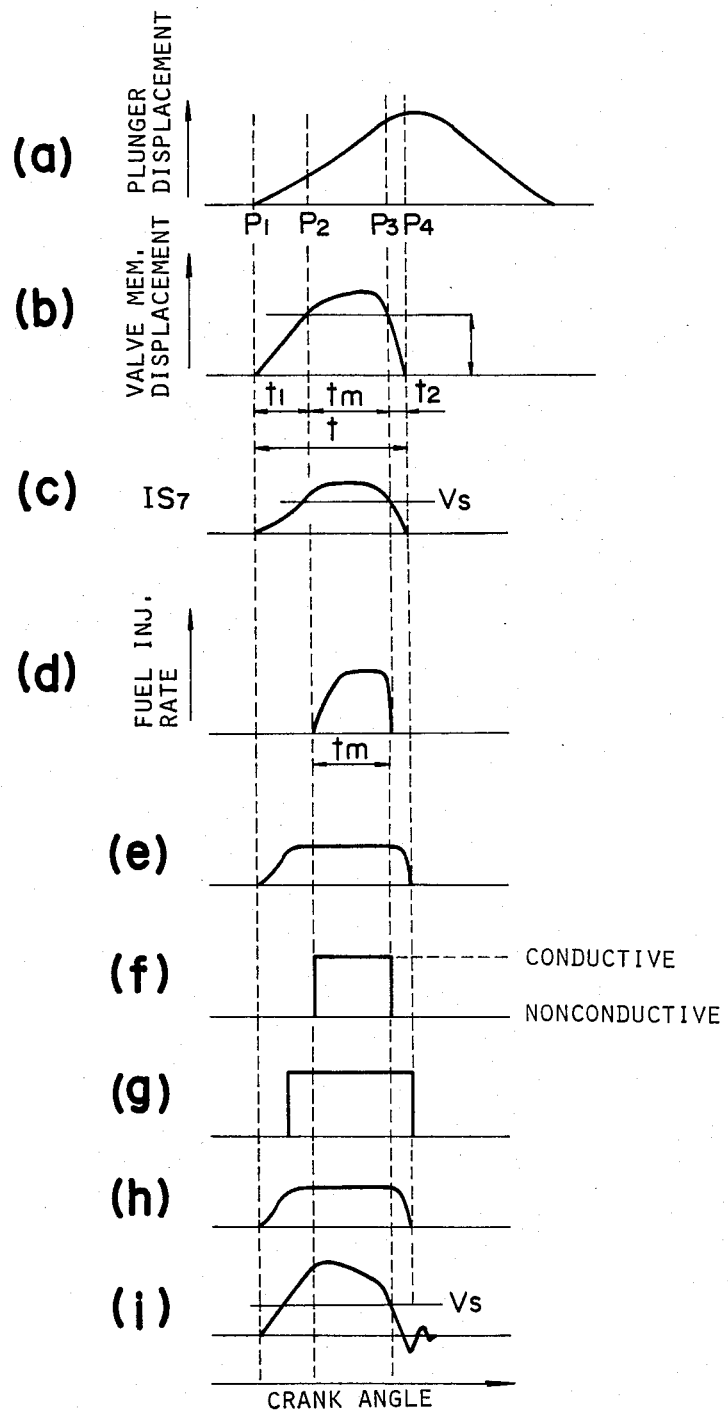
FIG. 4 shows characteristic curves of some factoring pertinent to the lift or displacement sensor of FIGS. 2 and 3, and those of alternative lift or displacement sensors illustrated in the drawings below.

Displacement or lift of the plunger 39 (see FIG. 2) varies as shown by the curve (a) in FIG. 4. Displacement or lift of the valve member 102 varies, as shown by the curve (b) in FIG. 4, in accordance with the displacement of the plunger 39. When the plunger 39 starts to be lifted or displaced at an initial crank angle $P_1$, the pressure of fuel in the delivery port 45 upstream of the delivery valve 46 starts to rise, displacing or lifting the valve member 102 from the closed position, as shown by the curve (b) of FIG. 4. When the fuel pressure reaches a predetermined level at a second crank angle $P_2$ subsequent to the first crank angle $P_1$ as shown in FIG. 4, the piston 106 emerges from the bore of the guide 101, starting fuel injection. In this way, the rate of fuel flow starts to increase from zero at the second crank angle $P_2$ as shown by the curve (d) in FIG. 4. Between the first and second crank angles $P_1$ and $P_2$, the piston 106 remains within the bore of the guide 101 so that fuel injection is prevented as shown by the curve (d) in FIG. 4, although the valve member 102 has already been displaced from the closed position as shown by the curve (b) in FIG. 4.

When the plunger 39 (see FIG. 2) is lifted or displaced to a position in which the spill port 59 (see FIG. 2) is unblocked by the control sleeve 60 (see FIG. 2), the pressure of fuel in the delivery port 45 starts to drop abruptly so that the valve member 102 starts to return quickly as shown by the curve (b) in FIG. 4. When the fuel pressure returns to the predetermined level at a third crank angle $P_3$ subsequent to the second crank angle $P_2$, the piston 106 re-enters the downstream end of the hollow of the guide 101, ending fuel injection as shown by the curve (d) in FIG. 4. At a fourth crank angle $P_4$ subsequent to the third crank angle $P_3$, the valve member 102 returns to the closed position as shown by the curve (b) in FIG. 4. Between the third and fourth crank angles $P_3$ and $P_4$, the spacing between the piston 106 and the valve member 102 is effective to draw fuel upstream back into the delivery port 45 downstream of the delivery valve 46.

The voltage of the signal $IS_7$ outputted from the lift or displacement sensor 25 varies, as shown by the curve (c) in FIG. 4, with lift or displacement of the valve member 102. Specifically, as lift or displacement of the valve member 102 increases and decreases as shown by the curve (b) in FIG. 4, the voltage of the signal $IS_7$ essentially increases and decreases, respectively, as shown by the curve (c) in FIG. 4.

The interval between the second and third crank angles $P_2$ and $P_3$, that is, a crank angle duration tm during which fuel injection is effected, can be expressed with reference to FIG. 4, as follows:

$$tm = t - (t_1 + t_2)$$

where t is the interval between the first and fourth crank angles $P_1$ and $P_4$ during which displacement or lift of the valve member 102 occurs; $t_1$ is the interval between the first and second crank angles $P_1$ and $P_2$; and $t_2$ is the interval between the third and fourth crank angles $P_3$ and $P_4$. In this case, the crank angle periods $t_1$ and $t_2$ are constant so that the crank angle duration tm equals the crank angle period t minus a constant.

The control unit 27 (see FIG. 1) determines the rate of fuel injection in response to the signal $IS_7$ outputted by the lift or displacement sensor 25. The control unit 27 comprises a comparator in the I/O circuit 31 (see FIG. 1). In this case, the comparator compares the voltage of the signal $IS_7$ with a preset slicing voltage Vs as shown in FIG. 4 to generate a pulse indicating whether or not the voltage of the signal $IS_7$ is greater than the slicing voltage Vs. The slicing voltage Vs is chosen so that the duration of a pulse from the comparator will essentially equal the length of time during which fuel injection occurs. The I/O circuit 31 comprises a counter for counting 1° pulses $IS_3$ from the crank angle sensor 21 during the duration of a pulse from the comparator to determine the fuel injection duration tm in terms of crank angle.

As shown in FIG. 5, the actual amount or quantity Q of fuel injected during each fuel injection stroke varies as a function of the fuel injection duration tm. As shown in FIG. 6, this amount of quantity Q of fuel also varies as a function of the engine rotational speed N, the two shown characteristic curves having been obtained at different engine rotational speeds. The relationship among the fuel injection quantity Q, the fuel injection duration tm, and the engine rotational speed N is also shown in FIG. 7 in which the curves were obtained at different fixed values of the fuel injection quantity Q with respect to varying fuel injection durations tm and varying engine rotational speeds N. Thus, the actual amount or quantity Q of fuel injected during each fuel injection stroke can be deduced on the basis of the fuel injection duration tm and the engine rotational speed N by using a present function $Q=f(tm\cdot N)$. Specifically, the memory 29 of the control unit 27 (see FIG. 1) may comprise a two dimensional map or table where values of the fuel injection quantity Q are plotted as the above preset function of the fuel injection duration tm and the engine rotational speed N. To determine the actual fuel injection quantity Q, the control unit 27 (see FIG. 1) may read the values from the table in the memory 29 on the basis of the fuel injection duration tm and the engine rotational speed N. It should be noted that the control unit 27 (see FIG. 1) derives the engine rotational speed N from the signal $IS_3$ outputted by the crank angle sensor 21. These read values may be corrected on the basis of the fuel temperature and the fuel density, since the actual fuel injection quantity Q depends only slightly on these parameters. Note that the fuel temperature and the fuel density are derived from the signals $IS_{12}$ and $IS_{13}$, respectively.

The fuel injection quantity Q determined by the control unit 27 (see FIG. 1) can be used in an electronic control system for an automatic transmission torque converter as an indication of the engine load.

In the above arrangement, the fuel injection quantity Q is represented in units of crank angle. The fuel injection quantity Q may also be represented in units of $t_o/N$ or $t_o/t_o'$ where $t_o$ is the length of time during which the valve member 102 is displaced or lifted from the closed position, N is the engine rotational speed, and $t_o'$ is the length of time during which the valve member 102 is in the closed position. To measure both of the times $t_o$ and $t_o'$, the control unit 27 may comprise a common counter in the I/O circuit 31.

Figure 8:
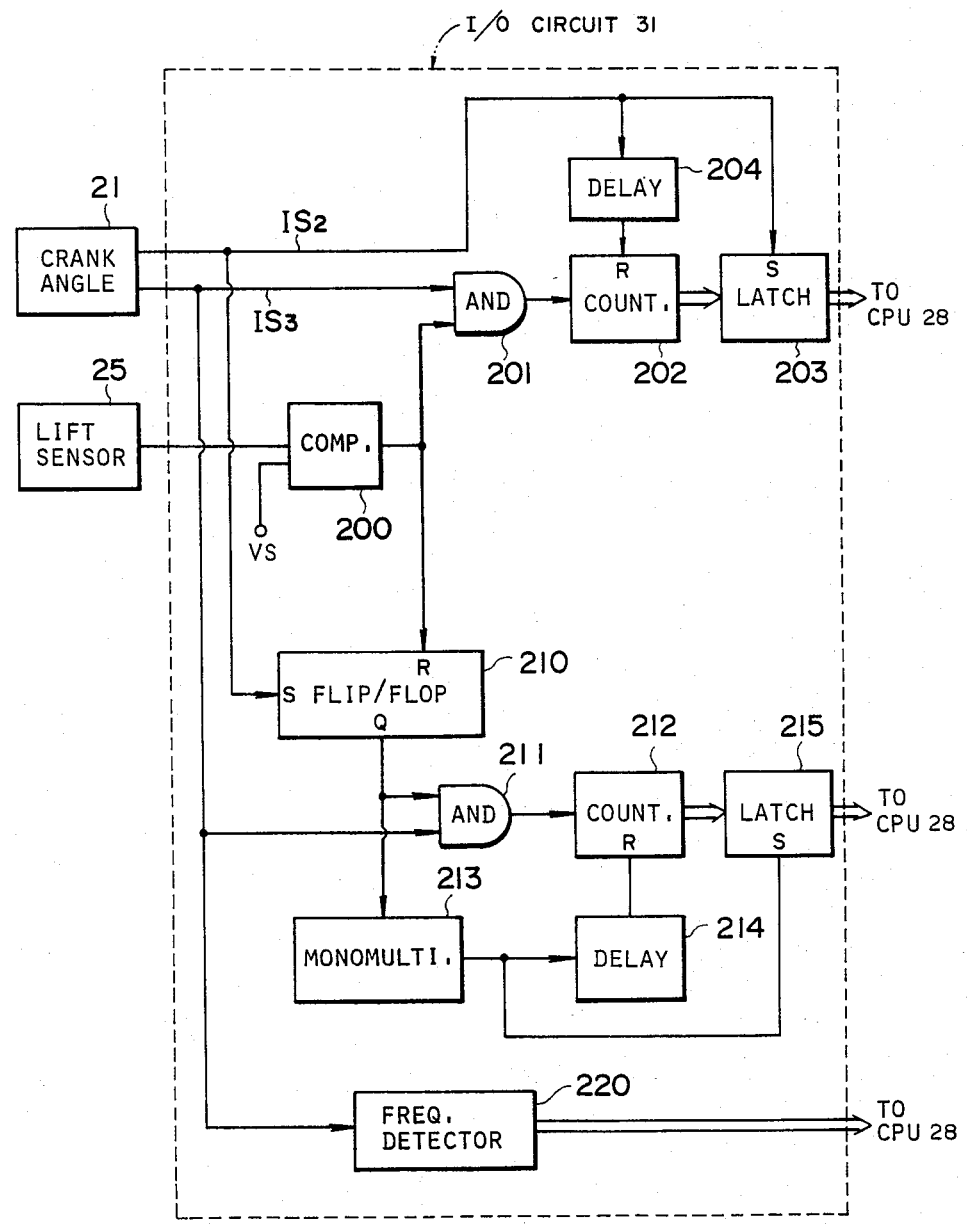
FIG. 8 is a block diagram showing details of part of the input/output circuit of FIG. 1 for determining the actual fuel injection duration and timing and the engine speed.
Figure 9:
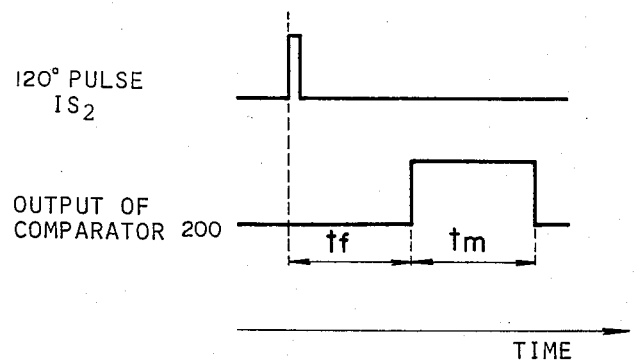
FIG. 9 is a timing chart of the waveforms of the 120° pulse signal $IS_2$ from the crank angle sensor 21 of FIG. 1 and the output of the comparator of FIG. 8 used to determine the actual fuel injection duration.

FIG. 8 shows details of part of the I/O circuit 31, which includes a comparator 200 and an AND gate 201. The first input terminal of the comparator 200 is connected to the output terminal of the lift or displacement sensor 25 to receive the signal $IS_7$ therefrom. The second input terminal of the comparator 200 is supplied with a preset slicing voltage VS. When the voltage of the signal $IS_7$ exceeds the slicing voltage VS, the output of the comparator 200 goes high. When the voltage of the signal $IS_7$ drops below the slicing voltage VS, the output of the comparator 200 goes low. As described previously, while the output of the comparator 200 is high, the fuel injection stroke is effected. The output terminal of the comparator 200 is connected to the first input terminal of the AND gate 201. The second input terminal of the AND gate 201 is connected to the output terminal of the crank angle sensor 21 to receive the 1° pulse signal $IS_3$ therefrom. While the output of the comparator 200 is high, the AND gate 201 allows the 1° pulses to pass to a counter 202. While the output from the comparator 200 is low, the AND gate 201 prevents the 1° pulses from passing. The output terminal of the AND gate 201 is connected to the clock input terminal of the counter 202, which counts the 1° pulses from the AND gate 201. The reset or clear terminal of the counter 202 is connected to the output terminal of a delay circuit 204. The input terminal of the delay circuit 204 is connected to the output terminal of the crank angle sensor 21 to receive the 120° pulse signal $IS_2$ therefrom. The delay circuit 204 retards the 120° pulses and applies the retarded pulses to the reset terminal of the counter 202. The counter 202 is reset or cleared when its reset terminal receives the pulses from the delay circuit 204. As shown in FIG. 9, the crank angle sensor 21 is designed such that the time of the occurrence of each 120° pulse will fall out of the time range during which the output of the comparator 200 is high. The output terminal of the counter 202 is connected to the input terminal of a latch circuit 203. The strobe or sample-control terminal of the latch circuit 203 is connected to the output terminal of the crank angle sensor 21 to receive the 120° pulse signal $IS_2$. When the strobe terminal of the latch circuit 203 receives the 120° pulses, the latch circuit 203 samples the output of the counter 202. The latch circuit 203 holds the sampled data until the strobe terminal thereof receives the subsequent pulse. The delay or retard time defined by the delay circuit 204 is chosen so that the latch circuit 203 samples the output of the counter 202 immediately before the counter 202 is reset or cleared. As a result, the sampled data held in the latch circuit 203 represents a duration tm, in terms or unit of crank angle, during which the output of the comparator 200 is high as shown in FIG. 9, i.e., during which fuel injection is effected. The central processing unit 28 (see FIG. 1) fetches the fuel injection duration data from the latch circuit 203.

The I/O circuit 31 includes a flip-flop circuit 210 and an AND gate 211. The set terminal of the circuit 210 is connected to the output terminal of the crank angle sensor 21 to receive the 120° pulse signal $IS_2$. The circuit 210 is set by the leading edges of the 120° pulses. The reset terminal of the circuit 210 is connected to the output terminal of the comparator 200. The circuit 210 is reset by changes in the output of the comparator 200 from a low level to a high level. As each fuel injection stroke starts, the output of the comparator 200 goes high so that the circuit 210 is reset. The output of the circuit 210 remains high for a time interval tf starting from the leading edge of the 120° pulse and ending at the low-to-high level change in the output of the comparator 200 as shown in FIG. 9. The output of the circuit 210 is low otherwise. The output terminal of the circuit 210 is connected to the first input terminal of the AND gate 211. The second input terminal of the AND gate 211 is connected to the output terminal of the crank angle sensor 21 to receive the 1° pulse signal therefrom. While the output of the circuit 210 is high, the AND gate 211 allows the 1° pulses to pass to a counter 212. While the output of the circuit 210 is low, the AND gate 211 prevents the 1° pulses from passing. The output terminal of the AND gate 211 is connected to the clock input terminal of the counter 212, which counts the 1° pulses from the AND gate 211. The reset or clear terminal of the counter 212 is connected to the output terminal of a monostable multivibrator 213 via a delay circuit 214. The input terminal of the multivibrator 213 is connected to the output terminal of the circuit 210, so that the multivibrator 213 is triggered by the high-to-low level change in the output of the circuit 210. When triggered, the multivibrator 213 outputs a pulse to the delay circuit 214, which retards the pulse applied to the reset terminal of the counter 212. The counter 212 is reset when the reset terminal thereof receives the pulses from the the delay circuit 214. The retard or delay time defined by the delay circuit 214 is chosen so that the counter 212 is reset at a time outside the interval tf during which the output of the circuit 210 is high. The output terminal of the counter 212 is connected to the input terminal of a latch circuit 215. The strobe or sample-control terminal of the latch circuit 215 is connected to the junction between the multivibrator 213 and the delay circuit 214. When the strobe terminal of the latch circuit 215 receives the trailing edges of pulses from the multivibrator 213, the latch circuit 215 samples the output of the counter 212. The latch circuit 215 holds the sampled data until the strobe terminal thereof receives the trailing edge of a subsequent pulse. The delay time defined by the delay circuit 214 is chosen so that the latch circuit 215 samples the output of the counter 212 immediately before the counter 212 is reset. As a result, the sampled data held in the latch circuit 215 represents the time interval tf, in terms or unit of crank angle, for which the output of the circuit 210 is high. This time interval tf represents the crank angle position of the start of each fuel injection stroke with respect to the preset crank angle defined by the 120° pulse signal $IS_2$. The central processing unit 28 (see FIG. 1) fetches the fuel injection start timing data from the latch circuit 215. The control unit 27 (see FIG. 1) adjusts the electromagnetic valve 54 (see FIG. 2) via the control signal $OS_5$ in accordance with the fuel injection start-time data.

The I/O circuit 31 includes a pulse-frequency detector 220. The input terminal of the detector 220 is connected to the output terminal of the crank angle sensor 21 to receive the 1° pulse signal $IS_3$ therefrom. The detector 220 monitors the pulse frequency of the signal $IS_3$ and generates a digital signal indicative thereof. Since the pulse frequency of the signal $IS_3$ varies as a function of the engine rotational speed, the output of the detector 220 represents the engine rotational speed. The central processing unit 28 (see FIG. 1) fetches the engine speed data from the output terminal of the detector 220.

Figure 10:
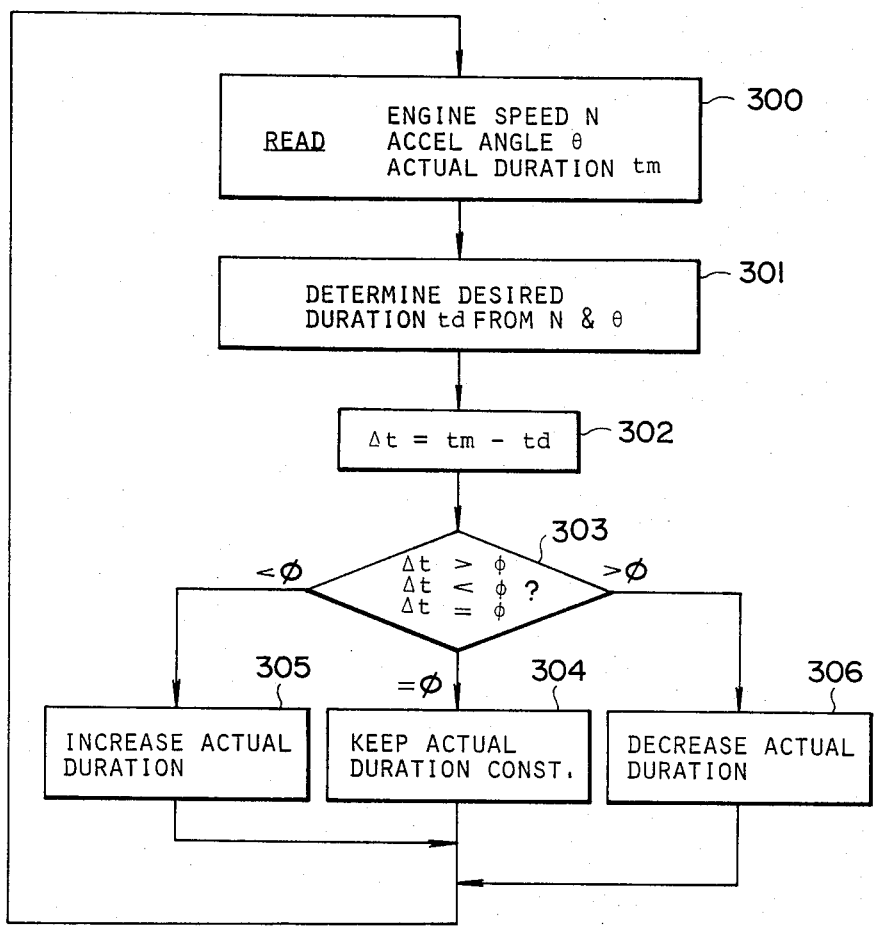
FIG. 10 is a flowchart illustrating operation of the control unit of FIG. 1.

FIG. 10 is a flow chart of operation of the control unit 27 (see FIG. 1) executed by a program stored in the memory 29. In a first step 300, the control unit 27 reads the engine rotational speed N, the accelerator position or depression angle $\theta$, and the actual fuel injection duration tm, derived from the signal $IS_3$, the signal $IS_1$, and the signal $IS_7$, respectively.

In a second step 301 subsequent to the step 300, the control unit 27 determines a desired fuel injection duration td on the basis of the engine rotational speed N and the accelerator pedal depression angle $\theta$. In this step, the control unit 27 fetches the desired fuel injection duration data from a table provided in the memory 29 in which values of the desired fuel injection duration td are plotted as a function of the engine rotational speed N and the accelerator pedal depression angle $\theta$.

In a third step 302 subsequent to the step 301, the control unit 27 calculates a value $\Delta t$ which equals the actual fuel injection duration tm minus the desired fuel injection duration td. After the third step 302, operation of the control unit 27 proceeds to a fourth step 303.

In the fourth step 303, the control unit 27 determines whether the value $\Delta t$ is positive, negative, or zero. When the value $\Delta t$ is zero, operation of the control unit 27 proceeds to a fifth step 304. When the value $\Delta t$ is negative, operation of the control unit 27 proceeds to a sixth step 305. When the value $\Delta t$ is positive, operation of the control unit 27 proceeds to a seventh step 306.

In the fifth step 304, the control unit 27 controls the circuit 18 (see FIG. 1) via the control signal $OS_4$ in such a manner that the motor 62 (see FIG. 2) remains at its current position and thereby holds the actual fuel injection duration unchanged.

In the sixth step 305, the control unit 27 adjusts the circuit 18 (see FIG. 1) via the control signal $OS_4$ in such a manner that the motor 62 (see FIG. 2) rotates in the direction of increasing the actual fuel injection duration.

In the seventh step 306, the control unit 27 adjusts the circuit 18 (see FIG. 1) via the control signal $OS_4$ in such a manner that the motor 62 (see FIG. 2) rotates in the direction of decreasing the actual fuel injection duration.

As a result of operations in the steps 305 and 306, the actual fuel injection duration will approach the desired value thereof if the actual value has deviated from the desired value.

After the steps 304, 305, and 306, operation of the control unit 27 returns to the first step 200, so that the above sequence of operation of the control unit 27 is periodically repeated.

FIG. 11 shows details of the step 303, and the subsequent steps 304, 305, and 306, in which first the control unit 27 defines a variable T which equals the absolute value of $\Delta t$ at a block 310, the value $\Delta t$ being defined in the step 302. After the block 310, the control unit 27 determines whether or not $T \leq A$ at a block 311, where A is a positive constant. If $T \leq A$, the control unit 27 controls the circuit 18 (see FIG. 1) via the control signal $OS_4$ in such a manner as to leave the actual fuel injection duration unchanged at a block 312, which corresponds to the step 304 (see FIG. 10). If $T > A$, operation of the control unit 27 proceeds to a block 313, at which the control unit 27 determines whether or not $\Delta t > 0$. If $\Delta t \leq 0$, the control unit 27 determines whether or not $T \leq B$, $T \leq C$, $T \leq D$, ... at blocks 314B, 314C, 314D, ..., respectively, where B, C, D, ... are positive constants and $A < B < C < D < $ .... If $T \leq B$, $T \leq C$, $T \leq D$, ..., the control unit 27 sets a variable S equal to the previous value of S minus b, the previous value S minus c, the previous value S minus d, ... at blocks 315B, 315C, 315D, ..., respectively, where the variable S represents the actual fuel injection duration; b, c, d, ... are positive constants; and $b < c < d < $ .... The blocks 315B, 315C, 315D, ... correspond to the step 306 (see FIG. 10). On the other hand, if $\Delta t > 0$, the control unit 27 determines whether or not $T \leq B$, $T \leq C$, $T \leq D$, ... at blocks 316B, 316C, 316D, ..., respectively. If $T \leq B$, $T \leq C$, $T \leq D$, ..., the control unit 27 sets the variable S equal to the previous value of S plus b, the previous value of S plus c, the previous value of S plus d, ... at blocks 317B, 317C, 317D, ..., respectively. The blocks 317B, 317C, 317D, ... correspond to the step 305 (see FIG. 10). The greater the value of T, the larger the adjustment of S, so that the actual fuel injection duration can quickly approach the desired value.

The relationship among the gradations of increase of the fuel injection duration may differ from that among the gradations of decrease of the fuel injection duration. If the intervals between the constants A, B, C, ... are regular, those between the constants a, b, c ... would preferably be irregular. If the intervals between the constants A, B, C, ... are irregular, those between the constants a, b, c, ... would preferably be regular.

The control unit 27 controls the fuel injection timing and the percentage of exhaust gas recirculated via the control signals $OS_1$, $OS_2$, and $OS_5$ on the basis of the engine rotational speed and the fuel injection quantity. In this case, the desired fuel injection duration td or the actual fuel injection duration tm can be used to represent the fuel injection quantity. If the motor 62 (see FIG. 2) has quick response characteristics, the actual value tm should preferably be used. If the motor 62 (see FIG. 2) has slow response characteristics, the desired value td should preferably be used.

Figure 12:
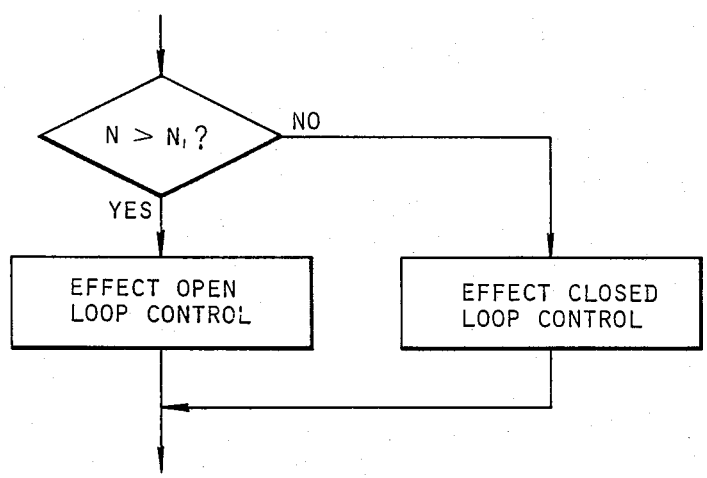
FIG. 12 is a flowchart illustrating the part of the operation of the control unit of FIG. 1 which is designed such that open-loop control is effected instead of closed-loop control when the engine speed exceeds a predetermined value.

To determine the actual fuel injection duration tm, constant-frequency pulses may be counted during the period representing the actual fuel injection duration tm. In this case, the higher the engine rotational speed N, the smaller the maximum counted number, resulting in lower accuracy in determining the actual fuel injection duration tm. In view of this fact, the control unit 27 may alternatively perform open-loop control of the fuel injection quantity if the engine rotational speed N exceeds a predetermined value $N_1$ and perform closed-loop control thereof if the engine rotational speed N is equal to or smaller than the predetermined value $N_1$, as shown in FIG. 12.

In another case, the closed-loop control may be effected at around a point in which the engine rotational speed N is 2,000 rpm and the fuel injection quantity Q is 30 (see FIG. 7), while the open-loop control may be effected at other points on the basis of table look-up way.

An analog or digital display may be provided to indicate the actual fuel injection duration or quantity. This arrangement could serve as a measuring instrument of the fuel injection duration or quantity.

Figure 13:
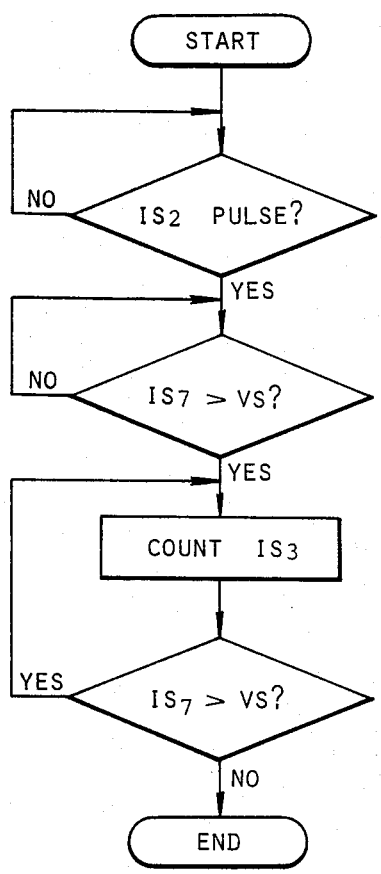
FIG. 13 is a flowchart of operation of a programmable counter to determine the actual fuel injection duration.

Usually, the valve member 102 (see FIG. 3) bounces slightly immediately after the valve member 102 first returns to the closed position. This bounce does not result in any fuel injection, since the pressure of fuel in the delivery port 45 has already dropped sufficiently by that time. As a result, the lift or displacement sensor 25 (see FIG. 3) outputs an erroneous signal during such bounce. In view of this fact, the counter 202 (see FIG. 8) may be of the programmable type, which starts to count the pulses from the AND gate 201 (see FIG. 8) when the output of the comparator 200 (see FIG. 8) goes high for the first time after the 120° pulse of the signal $IS_2$, as shown in FIG. 13. Thereafter, the counter 202 ends counting when the output of the comparator 200 goes low for the first time after the 120° pulse of the signal $IS_2$, as shown in FIG. 13. In this way, the counter 202 is prevented from counting during the bounce of the valve member 102.

Instead of the difference between the actual fuel injection duration tm and the desired fuel injection duration td, the difference between the actual fuel injection quantity and the desired fuel injection quantity may be used to control the fuel injection quantity. In this case, the actual fuel injection quantity is determined on the basis of the actual fuel injection duration and the engine rotational speed, and the actual fuel injection quantity is controlled so as to approach the desired quantity if the actual quantity has deviated from the desired quantity.

The desired fuel injection duration or quantity may also vary as a function of engine parameters other than the accelerator pedal depression angle.

Figure 14:
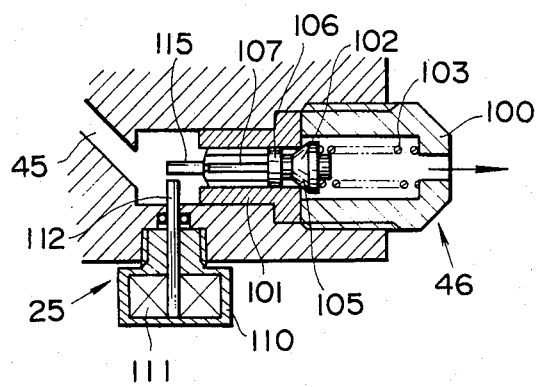
FIG. 14 is a sectional view of a first alternative lift or displacement sensor.

FIG. 14 shows a first alternative lift or displacement sensor 25, which differs from that of FIG. 3 as described below. An axial projection 115 made of magnetic material extends from the upstream end of the guide stem 107 in the direction away from the piston 106. The projection 115 may also be made of non-magnetic material. The core 112 extends perpendicular to the axis of the guide stem 107, i.e., to the direction of displacement of the stem 107 and the valve member 102. When the valve member 102 is in the closed position, the end of the core 112 is located near the tip of the projection 115 and an extension line from the axis of the core 112 intersects the projection 115.

The output $IS_7$ from this sensor 25 varies, as shown by the curve (e) in FIG. 4, in accordance with variation of displacement or lift of the valve member 102. Specifically, at start and end of displacement of the valve member 102, the output $IS_7$ sensitively increases and decreases with displacement of the valve member 102, respectively, since the tip of the projection 115 is moving immediately near the core 112. In the intermediate range of displacement of the valve member 102, the output $IS_7$ varies only slightly with displacement of the valve member 102, since the tip of the projection 115 is moving within a range distant from the core 112. In this case, the fuel injection rank angle duration tm can be deduced from the following equation:

$$tm = t - tg$$

where t is a crank angle interval during which the valve member 102 is displaced from the closed position and tg is a constant.

Figure 15:
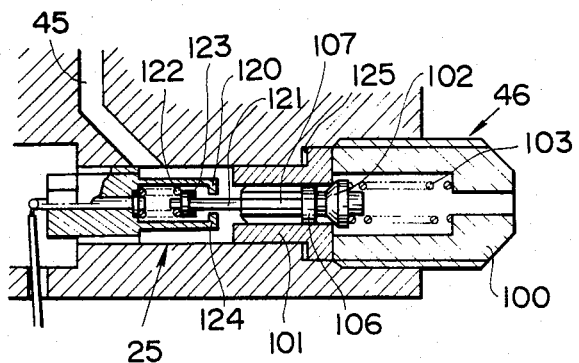
FIG. 15 is a sectional view of a second alternative lift or displacement sensor.

FIG. 15 shows a second alternative lift or displacement sensor 25, which includes a hollow cylindrical casing 120 and a pin 121. The casing 120 is secured to the housing of the fuel injection pump 7 (see FIGS. 1 and 2) in axial alignment with the guide 101. The pin 121 is coaxial with the casing 120 and the guide stem 107. The pin 121 movably extends through the end of the casing 120. The end of the pin 121 within the casing 120 is flanged. The other end of the pin 121 can engage the end of the guide stem 107 so that the pin 121 moves along with the stem 107. A weak compression spring 122 disposed in the casing 120 is seated between the flanged end of the pin 121 and the casing 120 to urge the pin 121 toward the stem 107 so as to press the pin 121 against the stem 107. A first contact 123 is mounted on the flanged end of the pin 121 inside the casing 120. The end of the casing 120 through which the pin 121 extends has an inwardly extending flange forming a second contact 124. As the valve member 102 moves from the closed position, the pin 121 moves together with the valve member 102 until the movable contact 123 comes into contact with the fixed contact 124. An adjusting shim 125 is provided between the flanged end of the guide 101 and the housing of the fuel injection pump 7 (see FIGS. 1 and 2) in order for the contacts 123 and 124 to come into contact with each other when the delivery valve 46 starts to effect fuel injection.

The output $IS_7$ of this sensor 25 changes, as shown by the line (f) in FIG. 4, between the nonconductive and conductive states in accordance with displacement of the valve member 102. Specifically, the interval during which the output $IS_7$ remains in the conductive state equals an interval during which fuel injection is effected. The output $IS_7$ is transmitted to the control unit 27 (see FIG. 1) via leads electrically connected to the contacts 123 and 124 respectively. In this case, the sensor 25 is connected in series to a DC voltage source. The output of the series combination of the sensor 25 and the source is applied to the input terminal of the AND gate 201 (see FIG. 8) instead of the output from the comparator 200 (see FIG. 8) applied thereto.

Figure 16:
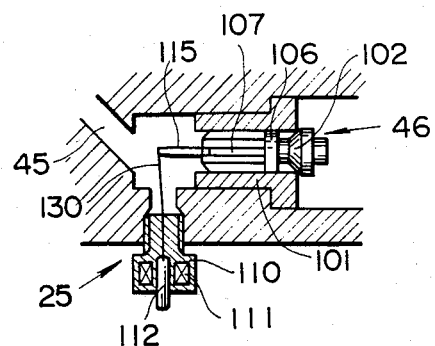
FIG. 16 is a sectional view of a third alternative lift or displacement sensor.

FIG. 16 shows a third alternative lift or displacement sensor 25, which differs from that of FIG. 14 as described below. The end of the core 112 is located within the casing 110. One end of a flexible strip 130 of magnetic material is secured to the core 112, and the other end of the strip 130 can engage the tip of the projection 115. The strip 130 extends essentially perpendicular to the projection 115. At the start of displacement of the valve member 102, the projection 115 disengages from the strip 130. At the end of displacement of the valve member 102, the projection 115 engages the strip 130.

The output $IS_7$ from this sensor 25 varies in a binary form, as shown by the line (g) in FIG. 4, with displacement of the valve member 102.

Figure 17:
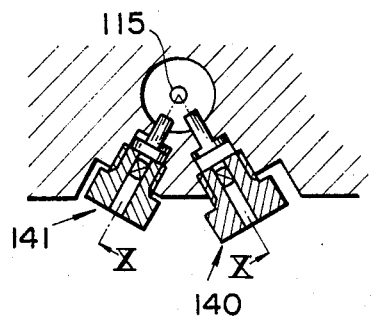
FIG. 17 is a sectional view of a fourth alternative lift or displacement sensor.
Figure 18:
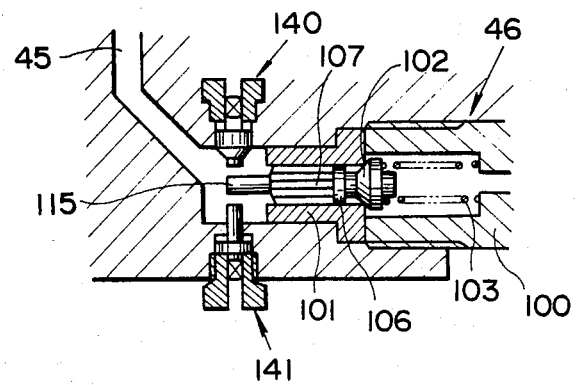
FIG. 18 is a sectional view taken along the line X—X of FIG. 17.

FIGS. 17 and 18 show a fourth alternative lift or displacement sensor 25, which includes a light-emitting section 140 and a photoelectric section 141. The section 140 includes, for example, a light-emitting diode. The section 141 includes, for example, a photodiode or a phototransistor. An axial projection 115 secured to the guide stem 107 extends in the direction away from the piston 106. The sections 140 and 141 are arranged so that most of light from the section 140 can reflect from the surface of the projection 115 and then enter the section 141 while the valve member 102 is displaced within a predetermined extent from the closed position, and then will not be reflected back to the section 141 while the valve member 102 is displaced beyond the predetermined extent.

The photoelectric section 141 generates the signal $IS_7$, which varies with displacement of the valve member 102 as shown by the curve (h) in FIG. 4.

The sections 140 and 141 may also be so arranged as to oppose each other with respect to the projection 115. In this case, the projection 115 selectively interrupts and allows transmission of light from the section 140 to the section 141 in accordance with displacement of the valve member 102.

Figure 19:
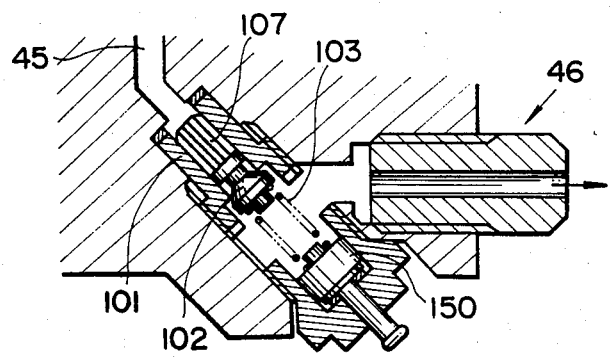
FIG. 19 is a sectional view of a fifth alternative lift or displacement sensor.

FIG. 19 shows a fifth alternative lift or displacement sensor 25 of the piezoelectric type, which includes a piezoelectric element 150 secured to the housing of the fuel injection pump 7 (see FIGS. 1 and 2). The piezoelectric element 150 is designed so as to form a seat for the spring 103, which is seated between the element 150 and the valve member 102. The piezoelectric element 150 receives, via the spring 103, a force which varies as a function of displacement of the valve member 102. Thus, the element 150 generates the signal $IS_7$ which varies as with displacement of the valve member 102 as shown by the curve (i) in FIG. 4.

It should be understood that further modifications and variations may be made in this invention without departing from the spirit and scope of this invention as set forth in the appended claims.

What is claimed is:

1. A control system for an internal combustion engine having a fuel injection nozzle, the fuel injection nozzle being connected via a fuel line to a fuel injection pump so that fuel forced out of the fuel injection pump is conducted via the fuel line to the fuel injection nozzle and is then injected into the engine via the fuel injection nozzle, the control system comprising:
   (a) a valve member movably disposed in the fuel line for allowing the fuel to pass to the fuel injection nozzle when the valve member is displaced from a closed position, whereby displacement of the valve member represents the rate of fuel injection into the engine;
   (b) means responsive to displacement of the valve member for sensing the rate of fuel injection into the engine and generating a signal indicative thereof;
   (c) means for sensing an operating condition of the engine and generating a signal indicative thereof;
   (d) means responsive to the engine operating condition signal for generating a signal indicative of a desired rate of fuel injection into the engine which varies as a function of the sensed engine operating condition; and
   (e) means responsive to the sensed fuel injection rate signal and the desired fuel injection rate signal for controlling the actual fuel injection rate on the basis of the difference between the sensed fuel injection rate and the desired fuel injection rate.

* * * * *

UNITED STATES PATENT AND TRADEMARK OFFICE
CERTIFICATE OF CORRECTION

PATENT NO. : 4,494,507
DATED : January 22, 1985
INVENTOR(S) : Seishi YASUHARA

It is certified that error appears in the above-identified patent and that said Letters Patent is hereby corrected as shown below:

Cover Page, after item [22], insert item --[30] Foreign Application Priority Data   July 19, 1982 [JP] Japan ............... 57-124515--

Signed and Sealed this

Second Day of July 1985

[SEAL]

Attest:

DONALD J. QUIGG

Attesting Officer      Acting Commissioner of Patents and Trademarks